Jan. 5, 1932.   C. J. BLEIL   1,840,149
METHOD OF EXTRACTING OILS
Filed April 12, 1928   3 Sheets-Sheet 3
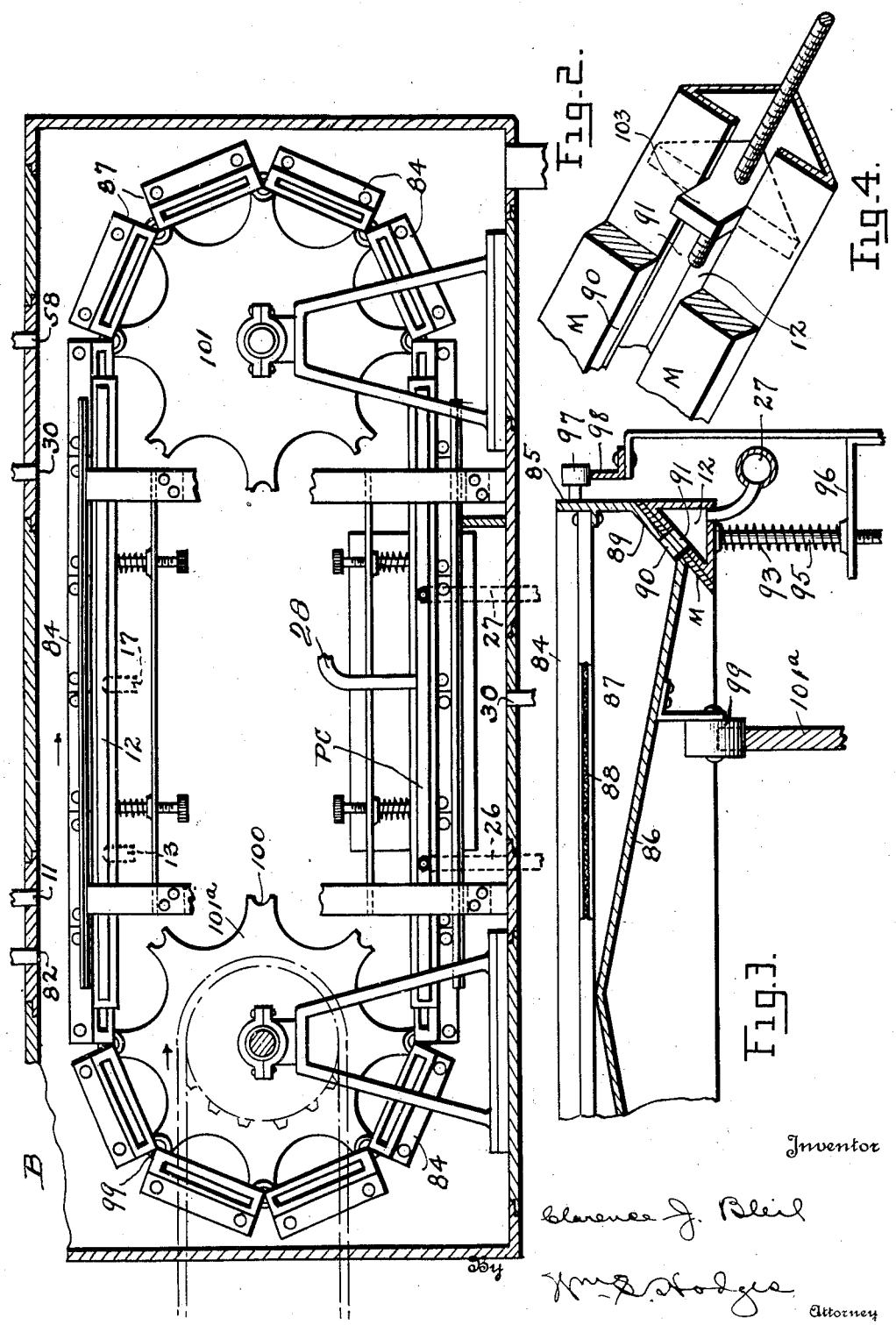
Inventor
Clarence J. Bleil
By
Attorney Patented Jan. 5, 1932

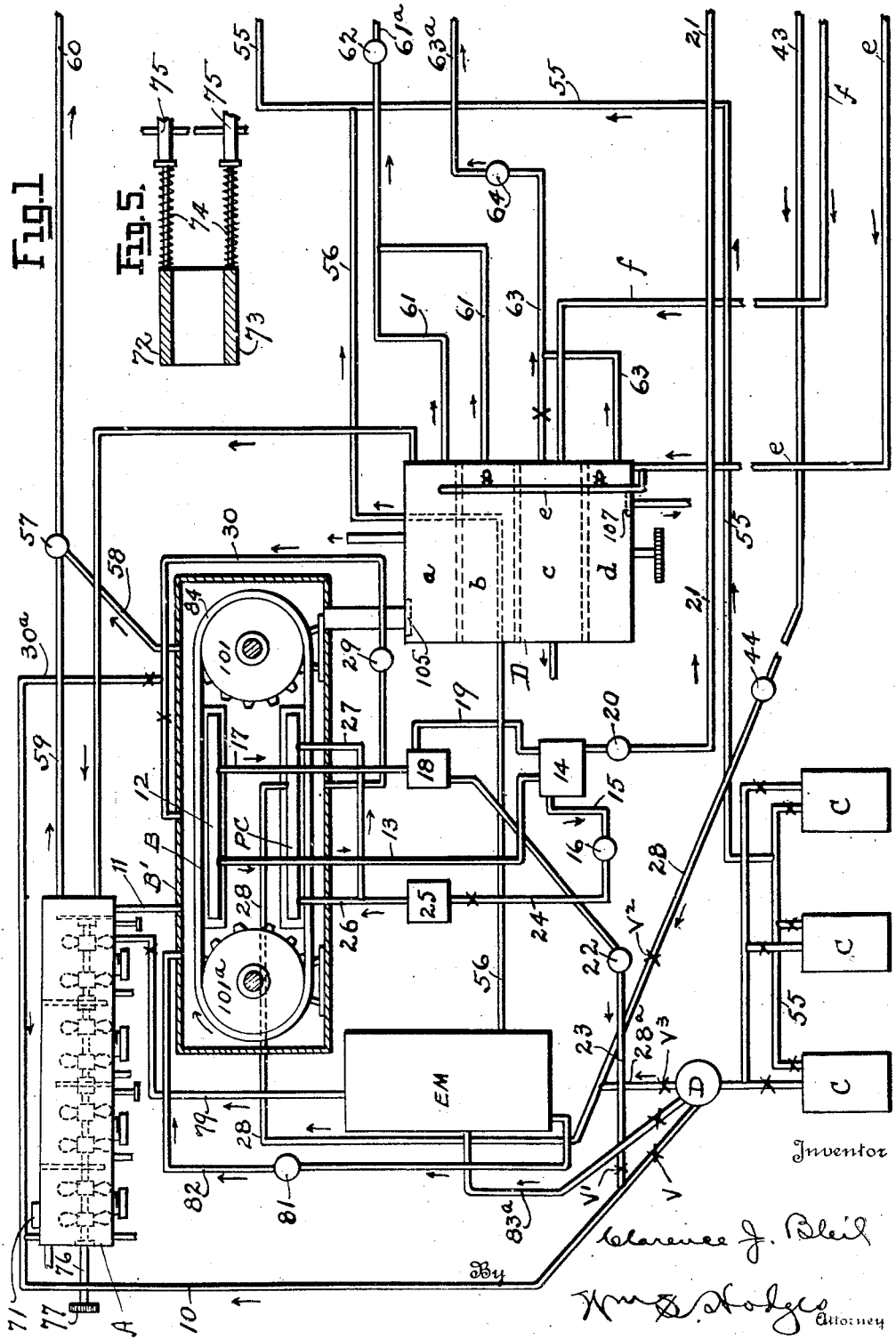

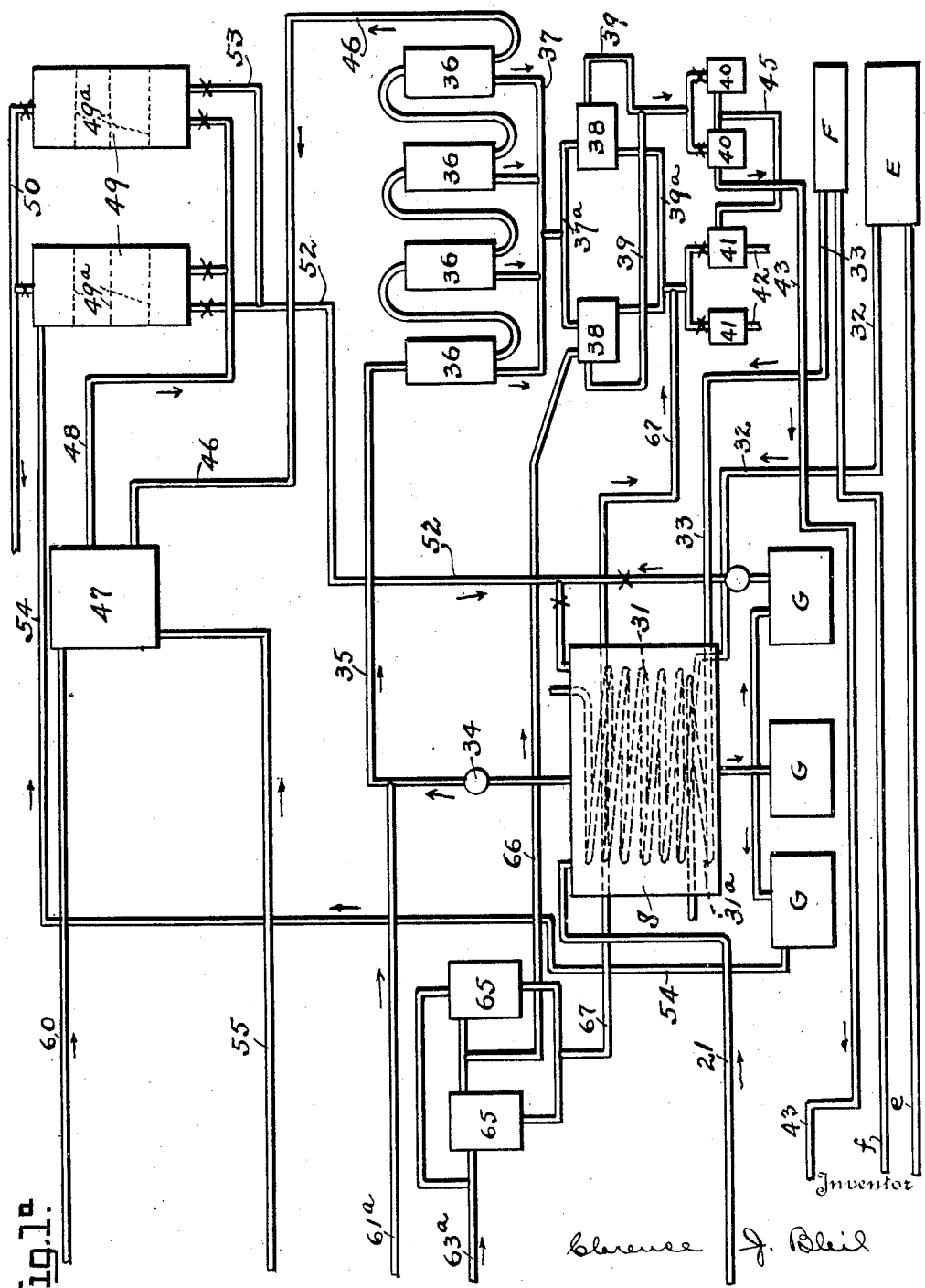

1,840,149

UNITED STATES PATENT OFFICE

CLARENCE J. BLEIL, OF LOS ANGELES, CALIFORNIA

METHOD OF EXTRACTING OILS

Application filed April 12, 1928. Serial No. 269,483.

This invention is a method of extracting oils and oleaginous constituents from seeds, sewage, and other masses of oil containing material.

One of the objects of the invention is to provide for simply, efficiently and continuously subjecting the material to be acted upon, to the action of an oil solvent, and the subsequent filtering of the oil laden solvent from said material, followed by the final separation of the oil and the solvent. A further object is to provide for condensing and recovering gaseous solvent which may be separated from the oil-laden solvent, during the last mentioned separation process. A further object is to provide for continuously delivering mixed solvent and oil-containing material to a continuously operating filter, and to automatically and continuously cleanse the filter of the residue at the end of the filtering stage of the operation, so as to insure the presentation of clean filters for the newly supplied material. A further object is to provide for quickly and effectively cleaning the filter screens of the major portion of the residue remaining after the filtering action, by means of a current of gaseous solvent forced through the screens from the underside thereof, and removing the same for subsequent drying. A further object is to provide for subsequently removing any remaining finer particles adhering to the screen, by forcing clean solvent through the screen from the underside and subjecting the mixed material and solvent thus obtained to an additional filtering action. A further object is to provide for the isolation of the weaker filtrate obtained during the latter portion of the period that the material is subjected to the action of the vacuum, and to mix the recovered weak filtrate with new oil bearing material so that the oil-bearing content of said filtrate may be increased.

The invention will be hereinafter set forth and particularly pointed out in the claims.

In the accompanying drawings:—

Figures 1 and 1ª are diagrammatic views, illustrating a system for extracting and recovering oils, constructed in accordance with the invention. Figure 2 is a side elevation and Figure 3 is a detail section view illustrating the filter. Figure 4 is a detail view illustrating the valve or member for separating the weaker filtrates from the stronger. Figure 5 is a detail view illustrating the type of valves for maintaining a vacuum in the mixer and drier respectively.

Referring to Figures 1 and 1ª of the drawing, A designates a mixer adapted to receive the material to be treated. B is the filter enclosed within a vacuum chamber B', and C designates the solvent storage tanks, any number of which may be used. The solvent employed may be any solvent having an affinity for oil, but it is preferred to use a highly volatile hydrocarbon, such for example, as benzol, triple distilled gasoline, etc. The oil bearing material to be operated upon is introduced into the mixer A in a manner to be described in detail later, and solvent is pumped from the tanks C by means of a pump D and introduced into the mixer through the pipe 10, which is controlled by a suitable valve V. The oil bearing material and the solvent are thoroughly intermingled in the mixer and then discharged through a discharge pipe 11, upon the top of the filter B. Said filter is in the form of a plurality of filter sections arranged in an endless train, as indicated in Figures 2 and 3, and will be described in detail later.

Located beneath the upper reach of the filter is a vacuum chamber 12, connected by means of a suction pipe 13, with a vacuum tank 14, and the upper portion of said vacuum tank is connected by a suction pipe 15 with a pump 16. Also connected with the vacuum chamber 12 is a supplemental suction pipe 17, leading to the top of a vacuum tank 18, the upper portion of which communicates with the tank 14, by means of a pipe 19. Any liquid drawn into the vacuum tank 14 is forced by pump 20 through a pipe 21 to the still S. Any liquid in the tank 18 is forced by the pump 22 through pipe 23, back to the pipe 10 so that it may be returned to the mixer A if desired, a valve V' controlling the flow of liquid to said pipe 10. The gases which are drawn into the tank 14 are forced by a pump 16 through a pipe 24 to an equalizing tank 25 and from said tank through branch pipes 26 and 27 to different separated compartments of a pressure chamber PC. Clear liquid solvent is delivered by the pipe 28, controlled by valve $V^2$, to an intermediate compartment of chamber PC. Liquid solvent may be delivered directly to pipe 28 from tanks C by means of pump D and a branch pipe $28^a$, which is controlled by a suitable valve $V^3$.

Said pressure chamber PC is located above the lower reach of the endless series of filters, so that the pressure of the gases and the solvent will be exerted against the back or under surfaces of the filter screens. The effect of this is to force out of said screens the cake or residue remaining after the filtering operation, the shock of the gases delivered by the pipe 27 serving to dislodge the greater portion of the mass of the residue so that it may drop to a suitable position for ready transfer to the drier D. The clean solvent delivered by the pipe 28 will remove the finer remaining particles so that they may be forced by the pump 29 through a pipe 30 so as to be delivered on the upper reach of the filter on top of the coarser materials, to again go through a filtering operation. Pressure from pipe 26 will blow out the moisture and liquid, together with any remaining solids, so that they may be collected in any desired manner for final disposal.

The still S may be of any suitable or desired form, such as that providing for the use of wet steam and super heated steam, the wet steam being supplied to suitable coils $31^a$ by a boiler E and pipe 32. Dry steam may be supplied to a coil 31 within the still and adjacent the bottom thereof, by a super heater F through pipe 33. It will be readily understood that the action of the heat upon the oil-laden solvent is to separate the solvent from the oil, the oil being transferred to the storage tanks G, the lighter solvent being drawn out by a pump 34 through pipe 35 and delivered to a condenser 36 of any desired form. The condensed solvent is drawn through pipes 37 and $37^a$ into a receiving tank 38, and while contained within said tank, a substantial separation of solvent and water will take place. From the tank 38 the solvent is drawn through a pipe 39 to a settling tank 40, and the water is drawn through pipe $39^a$ into a settling tank 41 and from thence through pipes 42 to the sewer or other point of disposal. All solvent that remains in the tank 40 is drawn through the pipe 43 by means of a pump 44 and delivered through the pipe 28 to the pressure chamber PC as previously stated. Any solvent which accumulates in the tank 41 may be drawn through the pipe 45 to the tank 40. Any number of tanks 38, 40 and 41 may be employed, but it is preferred to use each form of tank in groups of two or more, controlled by suitable valves, so that one tank may be receiving while the other is settling and emptying.

Any uncondensed gases which may leave the condenser 36 are conducted by a pipe 46 to a receiver 47 and from thence through a pipe 48 into one of a group of scrubbers 49. Said scrubbers may be of any desired type, but preferably contain a certain quantity of oil through which the gases travel upwardly and outwardly to the vent pipe 50, which may discharge into the atmosphere. Two scrubbers are shown, although any number may be employed, it being understood that valves are provided so that but one scrubber is working at a time, and each scrubber is provided with a plurality of transversely disposed screens $49^a$ through which the gases are caused to pass while being brought into contact with the oil. Said screens break up bubbles in such manner as to insure effective mixing of the solvent and oil. The action of the scrubber is to absorb from the gaseous vapor any solvent constitutents which may be carried thereby, and when the oil in the scrubbers becomes saturated with solvent to the desired extent, it may be drawn through the pipe 53 and returned to the still S, a new charge of oil being supplied to the scrubbers from the oil tanks through the pipes 52 and 53.

The storage tank G is provided with a vent pipe 54 leading to the scrubbers 49, and the solvent storage tank C and the emergency tank EM are provided with vent pipes 55 and 56, respectively, leading to the receiving chamber 47. By means of this arrangement, any gases venting from the respective tanks may be taken care of through the scrubbers.

As an important safety factor, a pump 57 through the medium of pipes 58 and 59 respectively, draws out of the incorporator A and filter chamber B, any inflammable gaseous vapors which may accumulate and delivers them through the pipe 60 to the receiver 47, where they are mixed with the gases from the condenser and passed through the scrubbers. In this way leakage of inflammable gases to the surrounding atmosphere is minimized.

The drier is provided with a plurality of compartments, some of which are connected by means of pipes 61 with a pump 62 which delivers through pipe $61^a$ into the pipe 35 leading to the condenser 36. The other chambers are connected by means of pipes 63 provided with a pump 64 delivering through pipe $63^a$ to a group of condensers 65, from which the solvent is conducted by means of a pipe 66 to the settling tanks 38, the water being conducted to the tanks 41 by pipe 67.

The mixer A may be of any desired construction, but it is preferred to employ a cylindrical casing, supported either horizontally or in a tilted position, but preferably slightly inclined downwardly toward the discharge end. It is divided into a plurality of compartments by baffle plates 70, which are staggered so as to insure that the material moving through the casing shall be caused to travel a tortuous path. Material is fed through the opening 71 at the top, said opening being controlled in any desired manner that will insure that the material to be operated upon may be placed in the mixer without substantial loss of vacuum. For instance, (referring to Figure 5) two valves 72 and 73 may be mounted one above the other, and both normally held to closed position by springs 74. Cams 75 may be mounted on separate shafts and operated in timed relation so that one of said valves will always be closed while the other is open. Located within the compartments produced by the partitions 70 are paddles carried by the shaft 76 which extends longitudinally through the mixer, and is driven by suitable power means (not shown), the shaft 76 being provided with a suitable power wheel 77 by means of which the shaft may be rotated from a suitable power source. The discharge end of the mixer is connected by means of a discharge pipe 11 with the filter chamber, as clearly shown in Figure 1.

If, for any reason, the discharge of the material through the pipe 11 should become in any way impeded, it is important to empty the mixer so as to prevent solidifying of the material therein to such an extent as to make it impossible to rotate the shaft. Under such conditions, the material is delivered through a pipe 79 controlled by a valve 79ª, to an emergency tank EM. When desired the material may be drawn from the emergency tank EM by the pump 81 and delivered to the filter through the pipe 82. Thus, the contents of the mixer may be emptied into the emergency tank and held until required. In order to make the contents of the emergency tank sufficiently fluid to insure its ready flow out through the pipe 82, solvent may be drawn from the tanks C and delivered to the emergency tank through the pipe 83ª by means of the pump D.

The filter B comprises a plurality of filter sections 84, each of which consists of a pan-like member provided with side walls 85, and bottom walls 86, the said bottom walls being inclined from the center outwardly. The end walls 87 are preferably formed of a flexible packing material normally unaffected by the action of the solvent, and a filtering screen 88 is supported by each section. The end walls 87 are constructed of a material which is sufficiently flexible to insure a maximum conformation of each to the other, of the contacting areas of the end walls of any two adjoining filter sections during horizontal travel of said sections. For instance, the end wall material may be any of the commercial forms of asbestos packing, although the invention is not limited in this particular. By this means, the material which is being deposited upon the filter sections is prevented from dropping in between said sections. Another advantage is that by reason of the flexibility of said walls, a vacuum tight joint may be maintained between contiguous filter sections. The bottom wall of each filter section is provided with an inclined side portion 89, provided with a slot 90 so that it may communicate with a complemental slot 91 formed in a vacuum chamber 12. Said vacuum chamber is adjustably and yieldably supported upon springs 93 encircling rods 95 adjustably mounted in bracket 96 on the frame of the filter and by means of said spring a close vacuum tight sliding contact is maintained between the wall 89 and the correspondingly shaped wall of the vacuum chamber 12. The vacuum is maintained in the chamber 12 through the pipes 13 and 17 as before described. The major portion of the weight of the filter sections is sustained by means of rollers 97 mounted on suitable axles carried by said sections and traveling on tracks 98 secured to the supporting frame. The adjoining ends of sections of the filter are pivotally connected as indicated at 99, and the pivot rods of said connections are positioned to engage correspondingly shaped teeth 100, of sprocket wheels 101, 101ª, the last mentioned sprocket wheel being driven in any desired manner. It will be noted that the wheel 101ª drives the filter sections by a pushing action, so that pressure is maintained tending to force the flexible end walls of the filter sections into engagement with each other, thereby maintaining a close engagement of said walls while the material is being deposited on the sections. Also by means of the pushing action any wear between the filter sections is taken up by forcing the sections toward each other rather than pulling them apart as would be the case if the sections were drawn along instead of being pushed.

It is preferred to divide the vacuum chamber into two or more parts, and this is done by means of one or more valves 103, adjustably mounted upon a rod 104, which extends out of one end of the chamber. By reference to Figure 4, it will be noted for the purpose of illustration, that the valve 103 may be adjusted to any desired position between the pipes 13 and 17, respectively, so that the heavier filtrate will pass to tank 14, and the lighter filtrate will pass to the tank 18. Interposed between the contiguous relative moving surfaces of the walls 89 of the filter sections and the complemental portions of the vacuum chamber is a body M of self lubricating bearing metal, such as Somet metal, or graphite impregnated metal, which will reduce the friction of said surfaces and yet maintain a close contact between them. The pressure chamber PC is a substantial duplicate of the vacuum chamber 12, and engages the filter sections in identically the same manner. For this reason, it is not considered necessary to repeat the details thereof.

The drier D may be of any desired construction, but in the system illustrated in the drawings, it consists of a cylindrical casing divided into a plurality of chambers by means of suitable partitions indicated in dotted lines. In Figure 1, four of such chambers are shown indicated respectively at $a$, $b$, $c$, and $d$. The residue remaining after filtration is fed to the chamber $a$, through a feed opening 105 which is closed in suitable manner, as by valves of the type illustrated in Figure 5, so that the material may be intermittently fed to said chamber $a$ without loss of vacuum. Suction is maintained in the chamber $a$ and $b$ by means of the pump 62 acting through the pipes 61. Suction is also maintained in the chamber $c$ and $d$ by the pump 64 acting through the pipes 63, a suitable valve being interposed between chamber $c$ and the pump 64, so that communication to the pump may be cut off for the purpose of building up a pressure within said chamber. Dry steam from the superheater F is supplied to a coil $f'$ within chamber $c$ by means of the pipe $f$, and wet steam from the boiler E is supplied to coils within the chambers $a$, $b$, and $d$ by means of the pipe $e$. The partition walls of the drier are provided with suitably arranged openings and with scrapers 115$^a$ so that the material is kept in constant agitation and gradually passes from the top chamber $a$ successively through the chambers $b$, $c$ and $d$ and the outlet 107. The dried material which passes through the drier D is delivered through an outlet opening 107 which is also normally closed by valves similar to those illustrated in Figure 5, which will intermittently permit the discharge from the chamber D without loss of vacuum.

It will be observed from the foregoing, that the residue is first subjected to a stage of heat and vacuum within the chambers $a$ and $b$, which will volatilize a substantial portion of the solvent remaining in the mixture. It is then treated to a stage of heat and pressure in chamber $c$, the communication to the pump 64 being cut off, and finally to a second stage of heat and vacuum in the chamber $d$, with the result that at the last mentioned stage the expansive effect of the difference in pressure will liberate aqueous moisture, and approximately all of the remaining solvent, together with the lighter oleaginous constituents. The vapors are collected separately as they are given off during the various vacuum stage, and are then treated to separate any remaining moisture and to recover the oil and solvent contained in said vapors.

In practice, it is preferred to finely divide, in suitable manner, any desirable oil bearing material and to mix it with any desired quantity of solvent. The mixing of the material and the solvent is effected by introducing them into the mixer or incorporator A at practically the same time, the solvent being intimately mixed with the oil-bearing material by reason of the agitation of the paddles P, during the passage of the ingredients through the incorporator A. Once the mixer begins to discharge its contents upon the filters, the operation becomes practically continuous. The filter sections are caused to travel by the sprocket wheels so as to be successively presented under the delivery end of the discharge pipe 11, the speed of travel of the filter sections being regulated so that each section will receive only such quantity of the mixture as will insure effective filtering during the travel of the filter sections from the point of deposit to the point where the residue is discharged into the drier D. As the filter sections travel from the pipe 11 to the right, as indicated in Figure 1, the action of gravity on the liquid in the mixture carried by the filter sections, aided by the suction of the pump 16 draws the oil-laden solvent out of the mixture into the pipes 13 and 17 respectively, the valve 103 having been adjusted so as to divide the vacuum chamber 12 into two receiving chambers of the desired relative proportions. In this connection, it will be understood that the number of such receiving chambers will vary with the number of valves employed, so that each receiving chamber will segregate a portion of the filtrate from the rest of the filtrate, and thus grade the same according to its oil bearing content. It will be observed that the stronger oil-laden filtrate will flow out through pipe 13, whereas the filtrate which flows out through pipe 17 is much weaker as to its oil bearing content.

The filtrate from pipe 13 flows into the tank 14 and the filtrate from pipe 17 flows into tank 18. Any gaseous constituents which may develop in the tank 18 are drawn through the pipe 19 into the tank 14, and the accumulated gaseous constituents from tank 18 and tank 14 are delivered by the pump 16 to the chamber PC, above those filter sections which constitute the lower reach of the filter, and back of said filter sections. The liquid accumulated in tank 14 is forced by the pump 20 to the still S, where it is subjected to the action of the heat of the steam from boiler E and from superheater F, the oil separating and flowing downwardly out of the still into the storage tanks G, the solvent being driven off in a more or less volatile state.

The volatile solvent is pumped from the still S by means of the pump 34, and delivered to the condenser 36, where the greater portion of the vapor is condensed into a liquid, and the mixed solvent and water later separated by passage through the settling tanks 38, 40 and 41. The liquid solvent thus recovered is pumped through pipe 43 by the pump 44, and delivered through pipe 28 back of the filters between the delivery ends of the pipes 26 and 27. Such gaseous constituents of the distilled vapors as are not condensed are carried through pipe 46, to the receiving chamber 47, and from thence through one or the other of the scrubbers 49. Each scrubber contains a body of oil which in course of time will become saturated with the gaseous solvent passing therethrough, and when the absorption stage is reached the mixed oil and solvent is drained from the scrubber into the still S and redistilled. The scrubbers are supplied with oil by means of pipes 52 and 53 leading from the tanks G to the scrubbers.

The pump 57 maintains a sufficient suction within the filter chamber B and the mixer A, to suck out any inflammable solvent gases which may accumulate in these chambers, and delivers them to the receiver tank 47 to be passed through the oil scrubbers, so that the solvent may be recovered for future use. In this way outward leaks into the atmosphere are greatly minimized and the danger of fire and explosions reduced.

Before the oleaginous material is mixed with the solvent it is treated in any desired manner or by any well known apparatus, so as to reduce it to a condition which will result in the breaking up of the films or globules of oil which surround the oil bearing particles, so that they may be readily reached by the solvent. In any event the material when mixed with the solvent is so finely divided that sooner or later it will tend to clog the filter cloths. This condition however is prevented by utilizing the liquid solvent which is delivered by the pipe 28, and the gases which are delivered by pipes 26, 27 to dislodge any fine particles which may be embedded in the filter screens after the initial removal of the major portion of the residue remaining after the filtering operation. The fine particles of the residue together with the liquid solvent mixed therewith are drawn out of the filter casing by the pump 29, and delivered to the top of the filter beds by the pipe 30, so as to be deposited on top of the coarser material which has been previously deposited on the filter sections. In this manner, the finer particles are prevented from working back to a position where they will clog the filter beds. Or, if desired, the material from pipe 30 may be delivered to the mixer through a pipe 30ª.

The residue discharged by the filter sections is delivered to the drier D through the opening 105. It will be noted that a vacuum is maintained in the sections a and b by means of the pump 62 connected with said chambers by the branch pipes 61. Any vapors which may accumulate in these chambers are delivered by said pump to the pipe 35, so as to be caused to travel through the condenser 36. The contents of the chamber c are heated by the dry steam coil f', and the chambers a, b and d are heated by the wet steam coils a'. Any liquids which accumulate in the said chambers c and d are drawn through the branch pipes 63 by the pump 64, and delivered to condenser 65. The water is separated at this point and is delivered through pipe 67 to the tanks 41, the lighter solvent constituents passing through pipe 68 to the tanks 38. The thoroughly dried and deodorized material in the drier D is discharged through the delivery port 115 to be disposed of in any desired manner.

Having thus explained the nature of the invention and described an operative manner of constructing and using the same, although without attempting to set forth all of the forms in which it may be made, or all of the forms of its use, what is claimed is:—

1. The method of extracting oleaginous constituents from oil bearing material comprising mixing such material with a solvent having an affinity for oil, filtering the mixture to separate the oil bearing solvent from the rest of the mass, treating the oil bearing solvent to separate the oil from the solvent, subjecting the residue remaining after filtration to a drying action in the absence of aqueous moisture other than that which is inherently carried by the original material, then bringing said residue into contact with steam, collecting the gases driven off by the steaming process, subjecting the collected gases to a condensing action to extract moisture and solvent therefrom, absorbing any anhydrous gaseous solvent thus obtained in a body of oil, and distilling the mass of oil absorbed solvent to separate the oil and the solvent.

2. The method of extracting oleaginous constituents from oil bearing material comprising intimately mixing finely divided material with a solvent having an affinity for oil, so as to effect a combination of the solvent and said oleaginous constituents, separating the oil bearing solvent from the rest of the mixture by passing said mixture through a filter which is maintained in a horizontal position during the filtering step, so that the full effect of gravity is obtained to insure that all liquids will pass downwardly through the mixture, reversing the filter so as to remove the main part of the residue, separating the oil from the solvent, and causing gases given off by the filtrate before the separation of oil and solvent to travel reversely through the filter so as to remove any remaining adhering residue.

3. The method of extracting oleaginous constituents from oil bearing material comprising intimately mixing finely divided material with a solvent having an affinity for oil, so as to effect a combination of the solvent and said oleaginous constituents, separating the oil bearing solvent from the rest of the mixture by passing said mixture through a filter, reversing said filter so as to remove the main part of the residue, separating the oil from the solvent, and causing gases given off by the filtrate before separation of the oil and solvent to travel reversely through the filter so as to remove any remaining residue which may adhere thereto.

4. The method of extracting oleaginous constituents from oil bearing material comprising intimately mixing finely divided material with a solvent having an affinity for oil, so as to effect a combination of the solvent and said oleaginous constituents, separating the oil bearing solvent from the rest of the mixture by passing it through a filter, causing said filter to travel horizontally during the filtering step, then reversing the filter and continuing its movement so as to remove the main part of the residue, separating the oil from the solvent, and causing gases given off by the filtrate before said separation to travel reversely through the filter so as to remove any remaining residue which may adhere thereto.

5. The method of extracting oleaginous constituents from oil bearing material comprising intimately mixing finely divided material with a solvent having an affinity for oil so as to effect a combination of the solvent and the said oleaginous constituents, separating the oil bearing solvent from the rest of the mixture by passing said mixture through a filter, causing said filter to travel horizontally during the filtering step so as to insure that all liquids will pass downwardly through the mixture, segregating different portions of the filtrate at various positions along the line of travel of said filter so as to grade said filtrate according to its oil bearing value at the points where it leaves the filter, separately collecting the different grades of filtrate, continuing to supply new mixture to the filter, reintroducing the weaker filtrate on top of the said new mixture, and treating the remaining filtrate to separate the oil from the solvent.

6. The method of extracting oleaginous constituents from oil bearing material comprising intimately mixing finely divided material with a solvent having an affinity for oil so as to effect a combination of the solvent and the said oleaginous constituents, separating the oil bearing solvent from the rest of the mixture by passing said mixture through a filter, reversing the filter so as to remove the main part of the residue, separating the oil from the solvent, causing gases given off by the filtrate before said separation to travel reversely through the filter so as to remove any remaining finer residue which may adhere thereto, continuing to supply new mixture to the filter, depositing the said finer residue upon coarser new material, and finally treating the filtrate to separate the oil from the solvent.

7. The method of extracting oleaginous constituents from oil bearing material comprising intimately mixing finely divided material with a solvent having an affinity for oil, so as to effect a combination of the solvent and said oleaginous constituents, separating the oil bearing solvent from the rest of the mixture by passing said mixture through a filter, reversing said filter to remove the main part of the residue, separating the oil from the solvent and causing gases given off by the filtrate before separation of the oil and solvent to travel reversely through the filter so as to remove any remaining residue which may adhere thereto, segregating different portions of filtrate at various positions along the line of travel of said filter so as to grade the filtrate according to its approximate oil bearing value at the points where it leaves the filter, separately collecting the different grades of filtrate, continuing to supply new mixture to the filter, and reintroducing the weaker filtrate into the said new mixture.

8. The method of extracting oleaginous constituents from oil bearing material comprising intimately mixing finely divided material with a solvent having an affinity for oil, so as to effect a combination of the solvent and said oleaginous constituents, separating the oil bearing solvent from the rest of the mixture by passing the mixture through a filter, reversing the filter so as to remove the main part of the residue, separating the oil from the solvent and causing gases given off by the filtrate before said separation to travel reversely through the filter so as to remove any remaining adhering residue, assisting the cleansing of the filter of said finer particles by discharging a stream of clear solvent against the underside of the filter, continuing to supply new mixture to the filter, and delivering the solvent and finer material thus removed onto the top of the new coarser material.

9. The method of extracting oleaginous constituents from oil bearing material comprising intimately mixing finely divided material with a solvent having an affinity for oil so as to effect a combination of the solvent and the said oleaginous constituents, separating the oil bearing solvent from the rest of the mixture by passing it through a filter, causing said filter to travel horizontally during the filtering step, removing the main part of the residue, causing gases given off by the filtrate before said separation to travel reversely through the filter so as to remove any remaining residue which may adhere thereto, segregating different portions of the filtrate at various positions along the line of travel of the filter so as to grade the filtrate according to its oil bearing value at the points where it leaves the filter, separately collecting the different grades of filtrate, continuing to supply new mixture to the filter, reintroducing the weaker filtrate to the new mixture and treating the remaining filtrate to separate the oil from the solvent, and depositing the residue removed by said gases upon said new mixture.

10. The method of extracting oleaginous constituents from oil bearing material comprising intimately mixing finely divided material with a solvent having an affinity for oil so as to effect a combination of the solvent and the said oleaginous constituents, separating the oil bearing solvent from the rest of the mixture by passing said mixture through a filter, reversing the filter so as to remove the main part of the residue, separating the oil from the solvent, causing gases given off by the filtrate before said separation to travel reversely through the filter so as to remove any remaining finer residue which may adhere thereto, continuing to supply new mixture to the filter, depositing said residue upon coarser new material, collecting filtrate at various positions along the filter so as to grade the filtrate according to its approximate oil bearing value separately collecting the different grades of filtrate, and reintroducing the weaker filtrate into the said new mixture, and finally treating the remaining filtrate to separate the oil from the solvent.

11. The method of extracting oleaginous constituents from oil bearing material comprising intimately mixing finely divided material with a solvent having an affinity for oil so as to effect a combination of the solvent and the said oleaginous constituents, separating the oil bearing solvent from the rest of the mixture by passing said mixture through a filter, causing said filter to travel horizontally during the filtering step and subsequently removing the main residue, causing gases given off by the filtrate to travel reversely through the filter so as to remove any remaining residue which may adhere thereto, continuing to supply new mixture to the filter, assisting the cleansing of the filter of said finer particles by discharging a stream of clear solvent against the underside of the filter, delivering the solvent and finer particles thus removed on the top of said previously supplied new material, segregating different portions of the filtrate at various positions along the line of travel of the filter so as to grade the filtrate according to its oil bearing value at the points where it leaves the filter, separately collecting the different grades of filtrate, reintroducing the weaker filtrate into the said new mixture, and finally treating the remaining filtrate to separate the oil from the solvent.

12. The method of extracting oleaginous constituents from oil bearing material comprising intimately mixing finely divided material with a solvent having an affinity for oil so as to effect a combination of the solvent and said oleaginous constituents, separating the oil bearing solvent from the rest of the mixture by passing said mixture through a filter which is maintained in a horizontal position during the filtering step so that the full effect of gravity is obtained, removing the main portion of the residue at the end of the filtering step causing said filter to travel in a closed chamber, maintaining an atmospheric reducing suction within said chamber, assisting the filtering operation by means of a stronger suction applied to the mixture being filtered, separating the oil from the solvent and causing gases given off by the filtrate before the separation of the oil and solvent to travel reversely through the filter so as to remove any remaining adhering residue.

13. The method of extracting oleaginous constituents from oil bearing material comprising intimately mixing finely divided material with a solvent having an affinity for oil so as to effect a combination of the solvent and the oleaginous constituents, passing the mixture through a filter to separate the oil bearing solvent from the rest of the mixture, causing the filter to travel in a closed chamber, maintaining an atmospheric reducing suction within said chamber, assisting the filtering operation by means of a stronger suction applied to the mixture being filtered, and finally separating the oil from the solvent.

14. The method of extracting oleaginous constituents from oil bearing material comprising intimately mixing finely divided material with a solvent having an affinity for oil, so as to effect a combination of the solvent and said oleaginous constituents, separating the oil bearing solvent from the rest of the mixture by passing said mixture through a filter, causing said filter to travel horizontally during the filtering step and then reversing it to remove the main part of the residue, separating the oil from the solvent and causing gases given off by the filtrate before separation of the oil and solvent to travel reversely through the filter so as to remove any remaining residue which may adhere thereto, returning said remaining residue to the filter, drying the main residue by successive vacuum and pressure treatments, and independently collecting the gases driven off during the respective vacuum and pressure treatments, and subjecting the collected gases to treatment to extract moisture and solvent therefrom and subsequently recovering said solvent.

15. The method of extracting oleaginous constituents from oil bearing material comprising intimately mixing finely divided material with a solvent having an affinity for oil so as to effect a combination of the solvent and said oleaginous constituents, separating the oil bearing solvent from the rest of the mixture by passing said mixture through a filter which is maintained in a horizontal position during the filtering step so as to insure that all liquids will pass downwardly through the mixture, removing the residue from the filter after the filtration step, drying said residue by bringing it into contact with the heating medium free of aqueous vapors within a closed chamber under vacuum, recovering any solvent given off during said treatment, and then subsequently subjecting said residue to the action of steam under pressure, followed by subjecting said residue to the action of heat and vacuum, recovering any oil-laden solvent.

16. The method of extracting oleaginous constituents from oil bearing material comprising intimately mixing said material with a solvent having an affinity for oil, so as to effect a combination of the solvent and the oleaginous constituents, carrying on the mixing in a closed chamber, filtering the mixture in a separate closed chamber, maintaining a suction upon both of said chambers so as to prevent outward escape of gaseous solvent by leakage and to also draw out any free gaseous vapors which may be given off by the material, assisting the filtering step by maintaining a stronger suction upon the mixture during filtration, separating the solvent of the filtrate from the oil carried thereby, and recovering the solvent contained in said vapors.

17. The method of extracting oleaginous constituents from oil bearing material comprising intimately mixing the material and an oil solvent within a closed chamber so as to effect a combination of the solvent and the oleaginous constituents, maintaining a suction upon said chamber so as to prevent outward escape of gaseous solvent by leakage and to also draw out of said chamber any free gaseous vapors which may be given off by the material during said mixing, filtering the mixture in a closed chamber, maintaining a suction upon said last mentioned chamber so as to prevent outward escape of gaseous solvent by leakage and to also draw out of the chamber any gaseous vapors given off by the material during the filtration, and recovering the solvent contained in said vapors.

18. The method of extracting oleaginous constituents from oil bearing material comprising mixing said material with a solvent having an affinity for oil, filtering the mixture to separate the oil bearing solvent from the rest of the mass, removing the residue from the filter, subjecting said residue first to a stage of heat and vacuum to volatilize solvent from the mixture, then to a stage of heat and pressure, and finally to a second stage of heat and vacuum so that at the last mentioned stage the expansive effect of the difference in pressure will liberate moisture, approximately all of the remaining solvent, and the lighter oleaginous constituents, separately collecting vapors as they are given off during the said respective vacuum and pressure treatments, extracting the moisture and solvent from said vapors, and subsequently recovering the solvent.

19. The method of extracting oleaginous constituents from oil bearing material comprising mixing such material with a solvent having an affinity for oil, filtering the mixture to separate the oil bearing solvent from the rest of the mass, treating the oil bearing solvent to separate the oil from the solvent, subjecting the residue remaining after filtration by first bringing it into contact with a heating medium free of aqueous vapors and simultaneously subjecting it to vacuum so as to volatilize the solvent from the mixture, then bringing said residue into contact with steam under pressure, and finally again subjecting said residue to a stage of heat and vacuum, so that at the last mentioned stage the expansive effect of the difference in pressure will liberate moisture, approximately all of the remaining solvent, and the lighter oleaginous constituents, separately collecting the vapors given off during the respective vacuum and pressure treatments, treating said vapors to separate the moisture and oil bearing solvent therefrom, and finally separating the oil from the last mentioned oil bearing solvent.

In testimony whereof I have hereunto set my hand.

CLARENCE J. BLEIL.